(12) United States Patent
Luo et al.

(10) Patent No.: US 10,976,620 B1
(45) Date of Patent: Apr. 13, 2021

(54) LIQUID CRYSTAL PANEL, LIQUID CRYSTAL DISPLAY DEVICE AND ELECTRONIC DEVICE

(71) Applicant: SHENZHEN CHINA STAR OPTOELECTRONICS TECHNOLOGY CO., LTD., Guangdong (CN)

(72) Inventors: Ping Luo, Guangdong (CN); Dong Luo, Guangdong (CN)

(73) Assignee: SHENZHEN CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 395 days.

(21) Appl. No.: 16/095,840

(22) PCT Filed: Aug. 3, 2018

(86) PCT No.: PCT/CN2018/098607
§ 371 (c)(1),
(2) Date: Oct. 23, 2018

(87) PCT Pub. No.: WO2019/227663
PCT Pub. Date: Dec. 5, 2019

(30) Foreign Application Priority Data

May 29, 2018 (CN) .......................... 201810528831.4

(51) Int. Cl.
*G02F 1/1362* (2006.01)
*G02F 1/1335* (2006.01)
(Continued)

(52) U.S. Cl.
CPC .... *G02F 1/136286* (2013.01); *G02F 1/13394* (2013.01); *G02F 1/13452* (2013.01);
(Continued)

(58) Field of Classification Search
CPC .............. G02F 1/1345; G02F 1/13452; G02F 1/13454; G02F 1/13394; G02F 1/13398;
(Continued)

(56) References Cited

U.S. PATENT DOCUMENTS

| 2006/0158599 A1* | 7/2006 | Koo ................... G02F 1/13394 349/155 |
| 2010/0025690 A1* | 2/2010 | Kim ...................... H01L 27/124 257/66 |

(Continued)

FOREIGN PATENT DOCUMENTS

| CN | 10188921 A | 11/2010 |
| CN | 103309107 A | 9/2013 |
| CN | 204314570 U | 5/2015 |

OTHER PUBLICATIONS

Chinese Office Action issued in corresponding Chinese Application No. 201810528831.4, dated May 27, 2020, pp. 1-9, The State Intellectual Property Office of People's Republic of China, Beijing, China.

*Primary Examiner* — Jessica M Merlin
(74) *Attorney, Agent, or Firm* — Leong C. Lei

(57) ABSTRACT

A liquid crystal panel including an array substrate and a color filter substrate which are disposed opposite and multiple fan-out lines and a color resist layer stacked along a direction from the array substrate toward the color filter substrate. The color film substrate is provided with a common electrode layer. A color resist layer and a columnar spacer are mutually abutted to ensure a distance between the array substrate and the color filter. The color resist layer includes a first plane facing the columnar spacer, and the common electrode line or the common electrode layer surrounds the color resist layer and exposes the first plane. When the liquid crystal panel is subjected to a larger external force such that deformation or displacement occurs between
(Continued)

the columnar spacer and the color resist layer, the common electrode line and the common electrode layer are not conductive to form a short circuit.

16 Claims, 5 Drawing Sheets

(51) Int. Cl.
    *G02F 1/1339*     (2006.01)
    *G02F 1/1343*     (2006.01)
    *G02F 1/1345*     (2006.01)

(52) U.S. Cl.
    CPC .. *G02F 1/133514* (2013.01); *G02F 1/134309* (2013.01); *G02F 1/136222* (2021.01); *G02F 2201/121* (2013.01)

(58) Field of Classification Search
    CPC ............. G02F 1/1339; G02F 1/133514; G02F 1/136222
    See application file for complete search history.

(56) References Cited

U.S. PATENT DOCUMENTS

| | | | |
|---|---|---|---|
| 2010/0045920 A1* | 2/2010 | Kwak | G02F 1/1339 349/153 |
| 2011/0090445 A1* | 4/2011 | Kim | G02F 1/1339 349/139 |
| 2012/0169977 A1* | 7/2012 | Tsubata | G02B 5/201 349/106 |
| 2013/0003008 A1* | 1/2013 | Okumoto | G02F 1/133514 349/155 |
| 2014/0332898 A1* | 11/2014 | Du | H01L 27/124 257/386 |
| 2015/0187294 A1 | 7/2015 | Chen | |
| 2017/0053949 A1* | 2/2017 | Shin | G02F 1/136227 |
| 2017/0285390 A1* | 10/2017 | Mun | G02F 1/13394 |

* cited by examiner

LIQUID CRYSTAL PANEL, LIQUID CRYSTAL DISPLAY DEVICE AND ELECTRONIC DEVICE

CROSS-REFERENCE TO RELATED APPLICATION

This application is a National Phase of International Application Number PCT/CN2018/098607, filed Aug. 3, 2018, and claims the priority of Chinese Patent Application No. 201810528831.4, entitled "LIQUID CRYSTAL PANEL, LIQUID CRYSTAL DISPLAY DEVICE AND ELECTRONIC DEVICE", filed on May 29, 2018, the disclosure of which is incorporated herein by reference in its entirety.

FIELD OF THE INVENTION

The present invention relates to a liquid crystal panel field, and more particularly to a liquid crystal panel having a columnar spacer in the fan-out region, a liquid crystal display device equipped with the liquid crystal panel, and an electronic device equipped with the liquid crystal display device.

BACKGROUND OF THE INVENTION

After the alignment process of the array substrate and the color filter substrate is completed, a columnar spacer and the color resist layer located in a display region are mutually abutted, and a gap between the array substrate and the color filter substrate in the display region can be ensured. Correspondingly, in order to ensure a same gap between the array substrate and the color filter substrate in a fan-out region of the array substrate, the columnar spacer and the color resist layer between the array substrate and the color filter substrate are usually disposed in the fan-out region.

It can be understood that the color resist layer and the columnar spacer in the fan-out region are prepared by the same process as the color resist layer and the columnar spacer in the display region, thereby the common electrode layer and the common electrode line respectively on the color filter substrate and the array substrate will cover on the color resist layer. When the liquid crystal panel is impacted by a larger external force, the columnar spacer may be displaced or compressed with the color resist layer, so that the common electrode line and the common electrode layer are conductive such that the liquid crystal panel generate a short circuit.

SUMMARY OF THE INVENTION

The present application proposes a circuit optimized liquid crystal panel, which can effectively prevent the liquid crystal panel from generating a short circuit in the fan-out region when subjected to a larger external force. This application includes the following technical solutions:

A liquid crystal panel, comprising: an array substrate and a color filter substrate which are disposed opposite; multiple fan-out lines and a color resist layer stacked along a direction from the array substrate toward the color filter substrate; wherein a projection of the color resist layer on the fan-out line is accommodated in the fan-out line, the color resist layer includes a first plane facing toward the color filter substrate; wherein a common electrode line corresponding to the fan-out line in shape is stacked on the fan-out line, the common electrode line is disposed around the color resist layer and at least expose the first plane; and wherein the color filter substrate provides with a common electrode layer along a direction from the color filter substrate toward the array substrate, and a columnar spacer is disposed between the common electrode layer and the first plane.

Wherein the color resist layer is a columnar body, and the color resist layer comprises four sidewalls connected to the first plane, and the common electrode line is disposed around the four sidewalls.

Wherein the first plane is rectangular, the first plane includes a first side and a second side which are adjacent, a section of the color resist layer perpendicular to the first side or the second side is a trapezoid, the color resist layer includes four sidewalls connected to the first plane, and the common electrode line is disposed around the four sidewalls.

Wherein the fan-out line has two layers, and the two layers of the fan-out line is insulated and stacked.

The present invention relates to another liquid crystal display device including a liquid crystal panel, and the liquid crystal panel comprises: an array substrate and a color filter substrate which are disposed opposite; multiple fan-out lines, a protection layer and a common electrode layer stacked along a direction from the array substrate toward the color filter substrate; wherein the color filter substrate provides with a color resist layer corresponding to a location of the common electrode line along a direction from the color filter substrate to the array substrate, the color resist layer includes a first plane facing toward the array substrate; wherein the color filter substrate is also provides with a common electrode layer, the common electrode layer is disposed around the color resist layer and lower than the first plane, the first plane is protruded with a columnar spacer, and the columnar spacer and the common electrode line are abutted with each other in order to ensure a distance between the array substrate and the color filter substrate.

Wherein the first plane is rectangular, the first plane includes a first side and a second side which are adjacent, a section of the color resist layer perpendicular to the first side or the second side is a trapezoid, the color resist layer includes four sidewalls connected to the first plane, the common electrode line is disposed around the four sidewalls, the common electrode is lower than the first plane.

Wherein the fan-out line has two layers, and the two layers of the fan-out line is insulated and stacked.

Wherein for anyone of the above liquid crystal panels, the fan-out line has two layers, and the two layers of the fan-out line is insulated and stacked.

The present invention further relates to a liquid crystal display device and an electronic device, the liquid crystal display device includes the above liquid crystal panel, and equipped in the electronic device.

The liquid crystal panel of the present application includes an array substrate and a color filter substrate which are disposed opposite and multiple fan-out lines and a color resist layer stacked along a direction from the array substrate toward the color filter substrate. Wherein the color filter substrate provides with a common electrode layer along a direction from the color filter substrate toward the array substrate. A color resist layer and a columnar spacer which are mutually abutted to ensure a distance between the array substrate and the color filter substrate are further disposed between the array substrate and the color filter substrate, Whether the color resist layer is on the array substrate or on the color resist layer, the first plane of the color resist layer facing toward the column spacer is insulated. The common electrode line or the common electrode layer is lower than the first plane. When the liquid crystal panel is subjected to a larger external force, even if deformation or displacement occurs between the columnar spacer and the color resist layer, the common electrode line and the common electrode layer are not conductive, and the short circuit between the color filter substrate and the array substrate is prevented due to a large external force. The liquid crystal panel adopting the technical solution of the present invention thus has higher reliability and longer service life.

DETAILED DESCRIPTION OF PREFERRED EMBODIMENTS

The technical solutions in the embodiments of the present application will be clearly and completely described in the following with reference to the accompanying drawings in the embodiments of the present application. It is apparent that the described embodiments are only a part of the embodiments of the present application, and not all of the embodiments. All other embodiments obtained by those skilled in the art based on the embodiments of the present application without creative efforts are within the scope of the present application.

Figure 1:
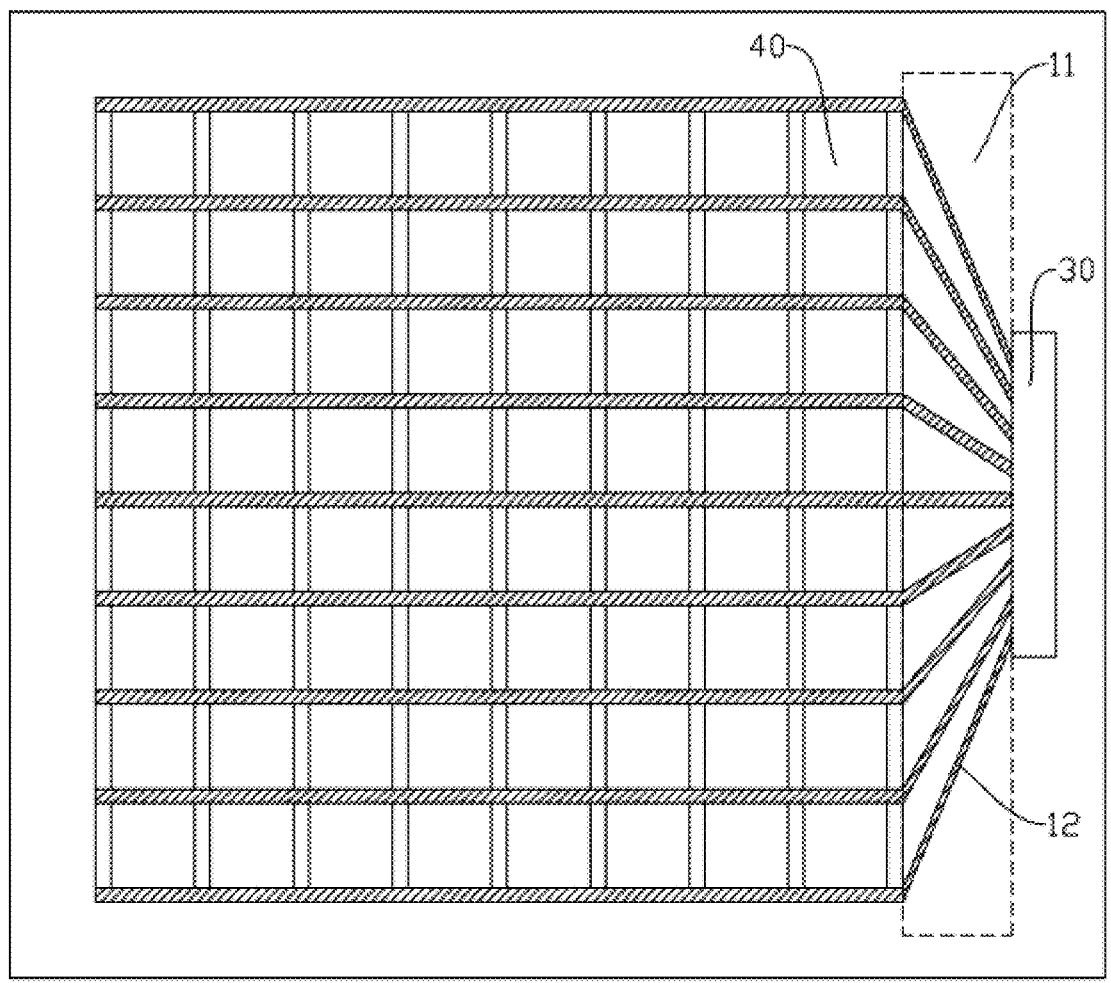
FIG. 1 is a schematic diagram of a liquid crystal panel according to the present application.
Figure 2:
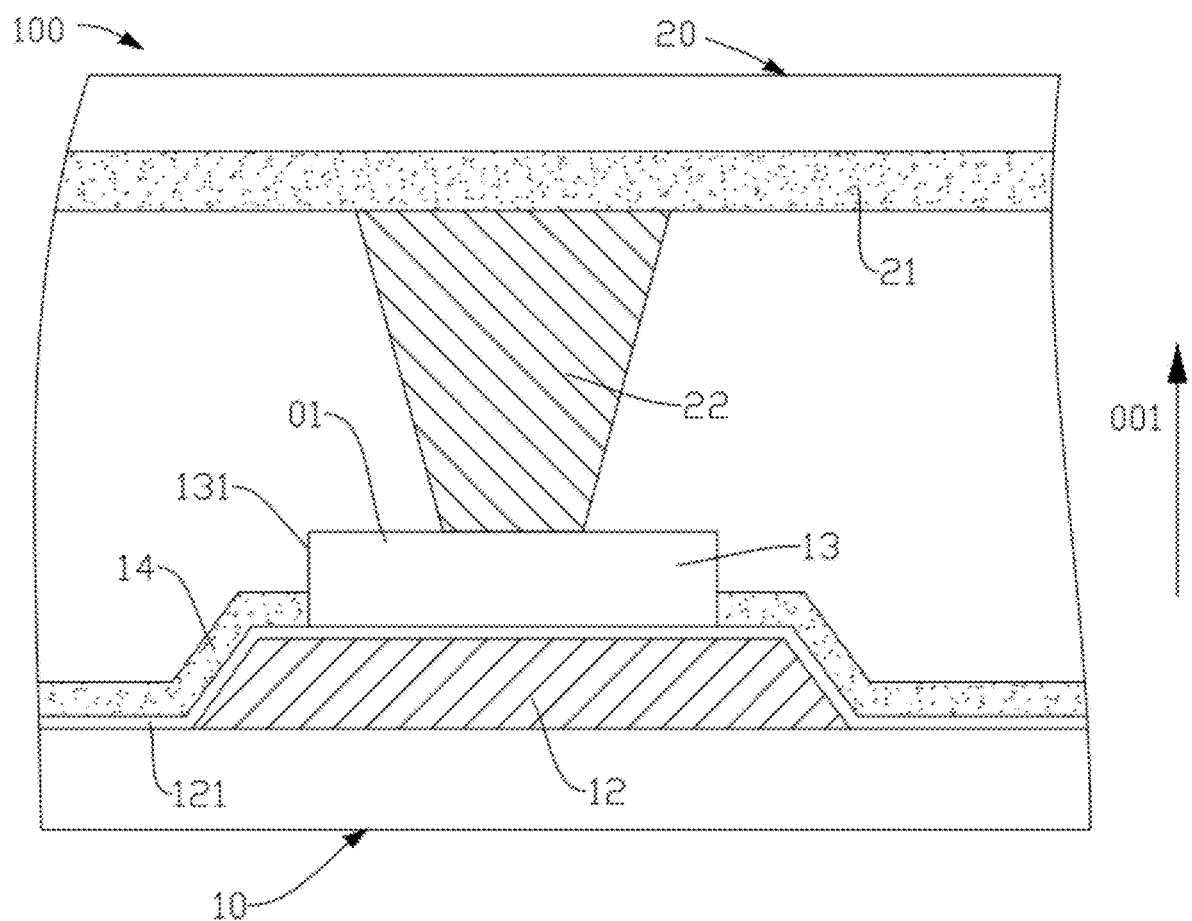
FIG. 2 is a cross-sectional view of the liquid crystal panel of the present application in the state of FIG. 1.

Please refer to a liquid crystal panel 100 shown in FIG. 1 and FIG. 2. The liquid crystal panel 100 includes an array substrate 10 and a color filter substrate 20 which are disposed opposite to each other. Specifically, the liquid crystal panel 100 of the present application is partially expanded for a fan-out region 11 of the array substrate 10. The fan-out region 11 is mainly used to arrange fan-out lines 12, and the fan-out lines 12 are used to transmit the scanning signal and the data signal of the timing controller 30 to the pixel units 40 in the display region of the liquid crystal panel 100, and further realize the display function of the liquid crystal panel 100.

Specifically, referring to FIG. 2, along a first direction 001 toward the color filter substrate 20 in the fan-out region 11 of the array substrate 10, the fan-out line 12 and a color resist layer 13 are stacked. Wherein the color resist layer 13 is closer to the color filter substrate 20 with respect to the fan-out line 12. Multiple color resist layers 13 are stacked on the fan-out line 12 in the extending direction of the fan-out line 12. Each of the color resist layers 13 is accommodated in a range of the width of the fan-out line 12. Understandable, the range of the width herein refers to the width dimension of the fan-out line 12 on any section perpendicular to the direction in which it extends. The color filter substrate 20 is provided with a common electrode layer 21 at a location of the color filter substrate 20 corresponding to fan-out region 11 and toward the first array substrate 10 and a columnar spacer 22 corresponding to the location of the color resist layer 13. The columnar spacer 22 and the color resist layer 13 are abutted with each other in order to ensure a distance between the array substrate 10 and the color filter substrate 20.

In the display region of the display panel 100, through the mutually abutting by the columnar spacer 22 and the color resist layer 13, the array substrate 10 and the color filter substrate 20 maintains a distance (cell gap). It can be understood that the distance between the array substrate 10 and the color filter substrate 20 is used to preserve liquid crystal molecules. In the fan-out region 11 of the array substrate 10, in order to maintain the distance between the array substrate 10 and the color filter substrate 20, the distance between the array substrate 10 and the color filter substrate 20 is the same as the cell gap in the display region of the display panel 100. In the fan-out region 11 of the array substrate 10, a color resist layer 13 and the columnar spacer 22 are also disposed to define a distance between the array substrate 10 and the color filter substrate 20.

Furthermore, a common electrode line 14 and a common electrode layer 21 are disposed oppositely between the array substrate 10 and the color filter substrate 20. The common electrode line 14 is disposed on the array substrate 10, the common electrode line 14 extends along an extending direction of the fan-out line 12, and the common electrode line covers the fan-out line 12 to reduce the loading effect of the fan-out line 12 during signal transmission. The common electrode layer 21 is disposed on the color filter substrate 20. The common electrode layer 21 is disposed on an entire surface of the color filter substrate 20 corresponding to the fan-out region 11, that is, the common electrode layer 21 is filled in the region of the color filter substrate 20 corresponding to the fan-out region 11.

Figure 7:
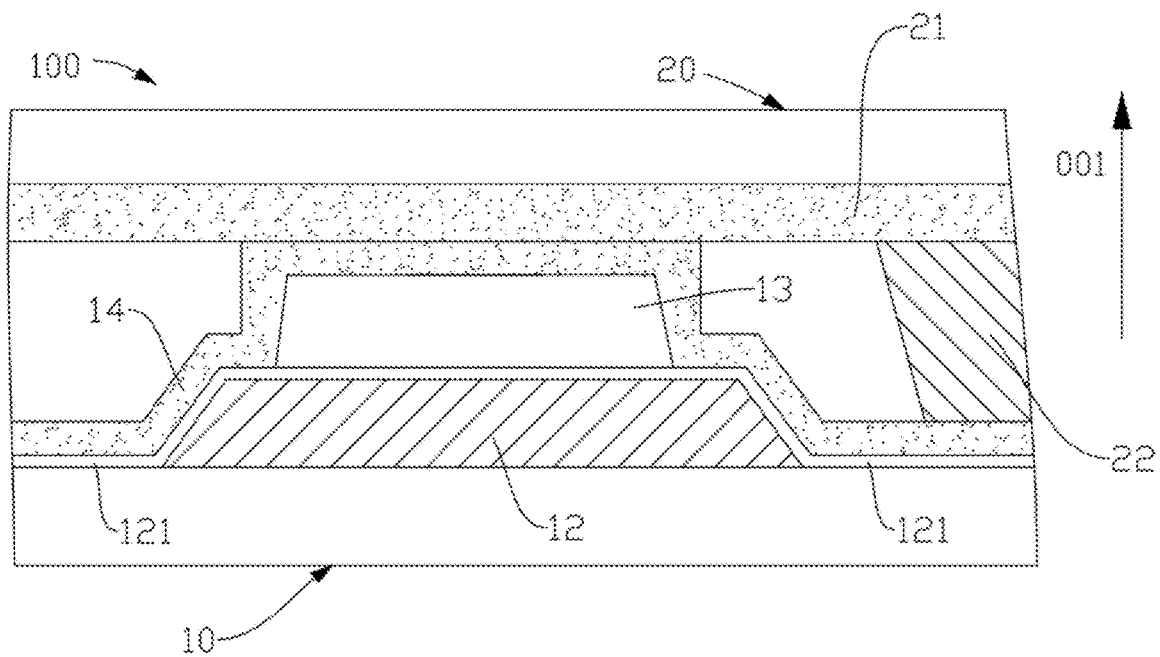
FIG. 7 is a schematic view showing a short circuit of a liquid crystal panel in the prior art.

The common electrode line 14 is located at a position of the array substrate 10 closest to the color filter substrate 20 along the first direction 001, and the common electrode layer 21 is located at the color filter substrate 20 closest to the array substrate 10 along the first direction 001. That is, the common electrode line 14 and the common electrode layer 21 are respectively located on the outermost layer of the array substrate 10 and the color filter substrate 20 in the first direction 001. As can be seen from FIG. 2, when the liquid crystal panel 100 is subjected to a larger external force, the columnar spacers 22 may be displaced or compressed with the color resist layer 13 such that the array substrate 10 and the color filter substrate 20 generate a contact. Since the array substrate 10 that faces the outermost side of the color filter substrate 20 is the common electrode line 14, and the color filter substrate 20 that faces the outermost side of the array substrate 10 is the common electrode layer 21, When the array substrate 10 comes into contact with the color filter substrate 20, the color filter substrate 20 comes into contact with the color resist layer 13. At this time, the common electrode line 14 is electrically connected to the common electrode layer 21 by covering the color resist layer 13, which will cause a short circuit of the liquid crystal panel 100 described in the present application (see FIG. 7).

To this end, as shown in FIG. 2, the liquid crystal panel 100 of the present application sets a surface of the color resist layer 13 facing the color filter substrate 20 as a first plane 01 on the color resist layer 13. The common electrode line 14 at least exposes the first plane 01 when laminating and covering the fan-out line 12. That is, the common electrode line 14 avoids covering a top position of the color resist layer 13 such that an abutting location of the columnar spacer 22 and the color resist layer 13, that is, the first plane 01 has no conductive material. When the liquid crystal panel 100 is subjected to a larger external force, the columnar spacers 22 may be displaced or compressed with the color resist layer 13 such that the array substrate 10 and the color filter substrate 20 are in contact with each other and are in contact with each other. The position is the first plane 01 and the common electrode layer 21.

Since the color resist layer 13 is made of an insulation material, the conduction short circuit between the array substrate 10 and the color filter substrate 20 is avoided. It can be understood that the liquid crystal panel 100 manufactured according to the technical solution of the present application effectively avoids a short circuit caused by larger external impact between the array substrate 10 and the color filter substrate 20 because the common electrode line 14 exposes the first plane 01. The liquid crystal panel 100 thus has higher reliability and service life.

For the cooperation of the common electrode line 14 and the color resist layer 13, since the common electrode line 14 needs to expose the first plane 01 of the color resist layer 13, therefore, the common electrode line 14 can be disposed around the color resist layer 13. The enclosing of the common electrode line 14 to the color resist layer 13 can maximize the coverage area of the common electrode line 14 to the fan-out line 12. As can be seen from the foregoing, the role of the common electrode line 14 is to eliminate the loading effect of the fan-out line 12. Therefore, under the premise that the first plane 01 affects the coverage area of the common electrode line 14 on the fan-out line 12, maximizing the area of the common electrode line 14 after exposing the first plane 01 is advantageous for improving the efficiency of the common electrode line 14. In one embodiment, the color resist layer 13 is a cuboid, and the color resist layer 13 includes four sidewalls 131 connected to the first plane 01. At this time, the common electrode line 14 is disposed around the four sidewalls 131 to expose the first plane 01 while maximizing the area.

Figure 3:
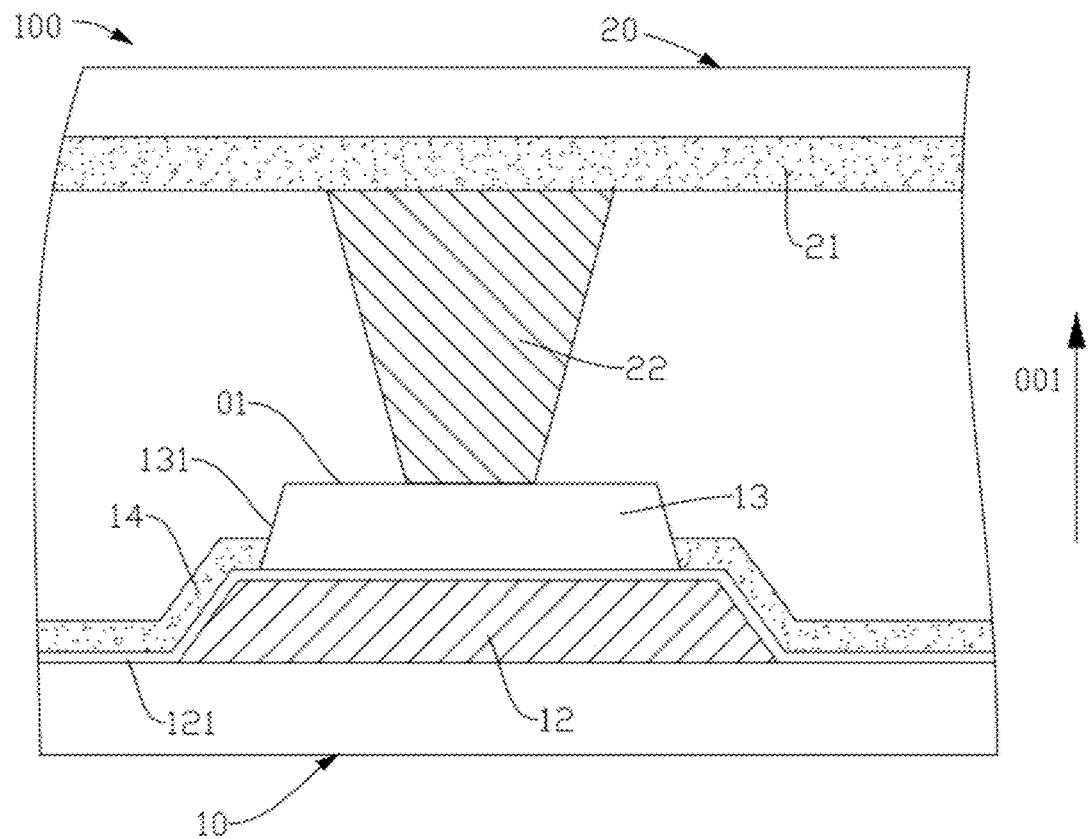
FIG. 3 is a schematic cross-sectional view of the liquid crystal panel according to another embodiment of the present application.

In the above embodiment, it is preferable that the color resist layer 13 has a rectangular shape. In actual production, the color resist layer 13 is more in a trapezoidal state due to limitations of the process. Specifically, in an embodiment, the first plane 01 is rectangular in a direction perpendicular to the first direction 001, and the first plane 01 includes a first side and a second side which are adjacent. The color resist layer 13 is formed in a trapezoidal shape on a section perpendicular to the first side or the second side (see FIG. 3). At this time, the surrounding of the common electrode line 14 to the color resist layer 13 is still using the four sidewalls 131 as a boundary. That is, the common electrode line 14 surrounds the four sidewalls 131.

Figure 4:
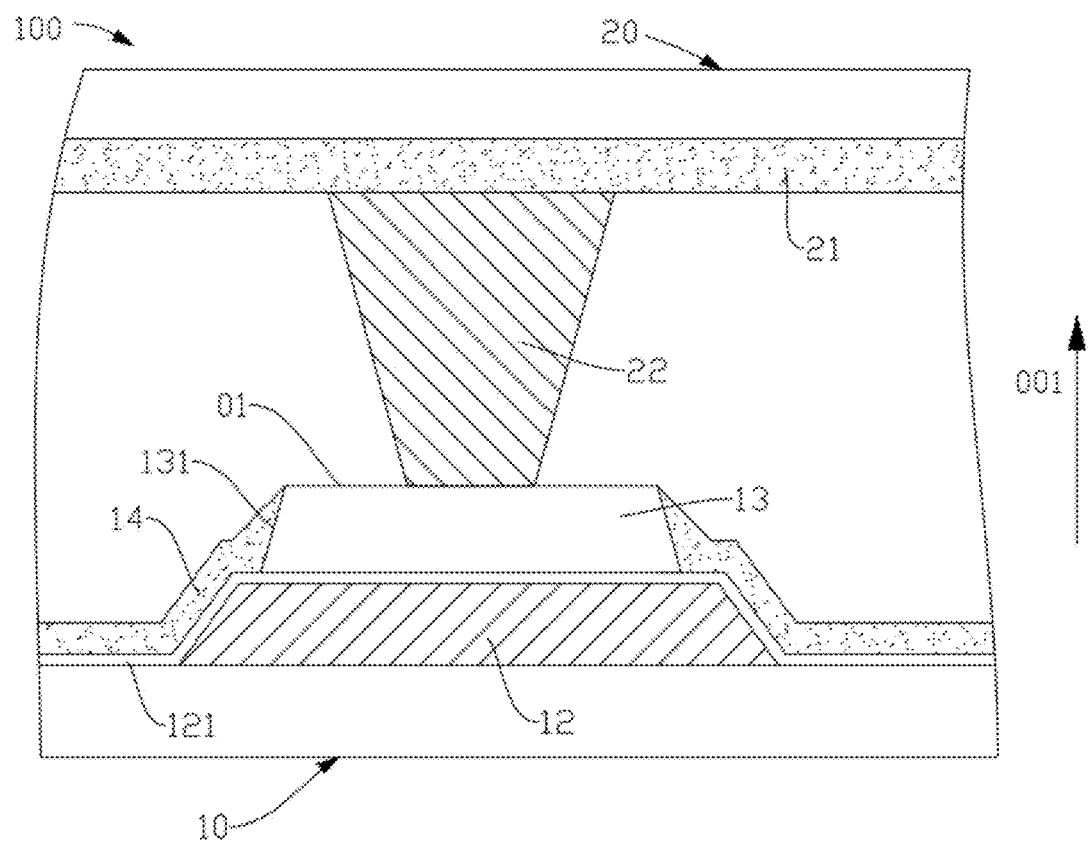
FIG. 4 is a cross-sectional view of the liquid crystal panel according to another embodiment of the present application.

Further, in order to maximize the coverage area of the common electrode line 14 with respect to the fan-out line 13, for the four sidewalls 131, since the color filter substrate 20 is in contact with the color resist layer 13 by an external force only at the first plane 01, so the common electrode line 14 can at least partially cover the four sidewalls 131, and the common electrode line 14 is lower than the first plane 01, so as not to cause the short circuit problem of the liquid crystal panel 100. Referring to FIG. 4, in such an embodiment, the common electrode line 14 completely covers the four sidewalls 131. At this time, the common electrode line 14 only exposes the first plane 01, and the common electrode line 14 is the largest area covering the fan-out line 12 for the liquid crystal panel 100 of the present application.

In the display region of the display panel 100, the color resist layer 13 is generally formed by three colors of "R\G\B", that is, the color resist layer 13 includes a red color resist layer, a green color resist layer, and a blue color resist layer. This is set by the display rendering scheme of the display panel 100. In another embodiment, the color resist layer 13 can also adopt another color composition or arrangement. In the fan-out region 11, since the fan-out region 11 is located outside the display region of the display panel 100, the color resist layer 13 in the fan-out region 11 has no filtering effect, and only to abut against the columnar spacer 22 to maintain the distance between the array substrate 10 and the color filter substrate 20. In the fan-out region 11, the color resist layer 13 may be formed by multiple color resist layers or a monochromatic resist layer. For the display panel 100 of the present application, the specific color of the color resist layer 13 is not strictly limited. In one embodiment, the color resist layers 13 in the fan-out area 11 are all blue resist layers.

Figure 5:
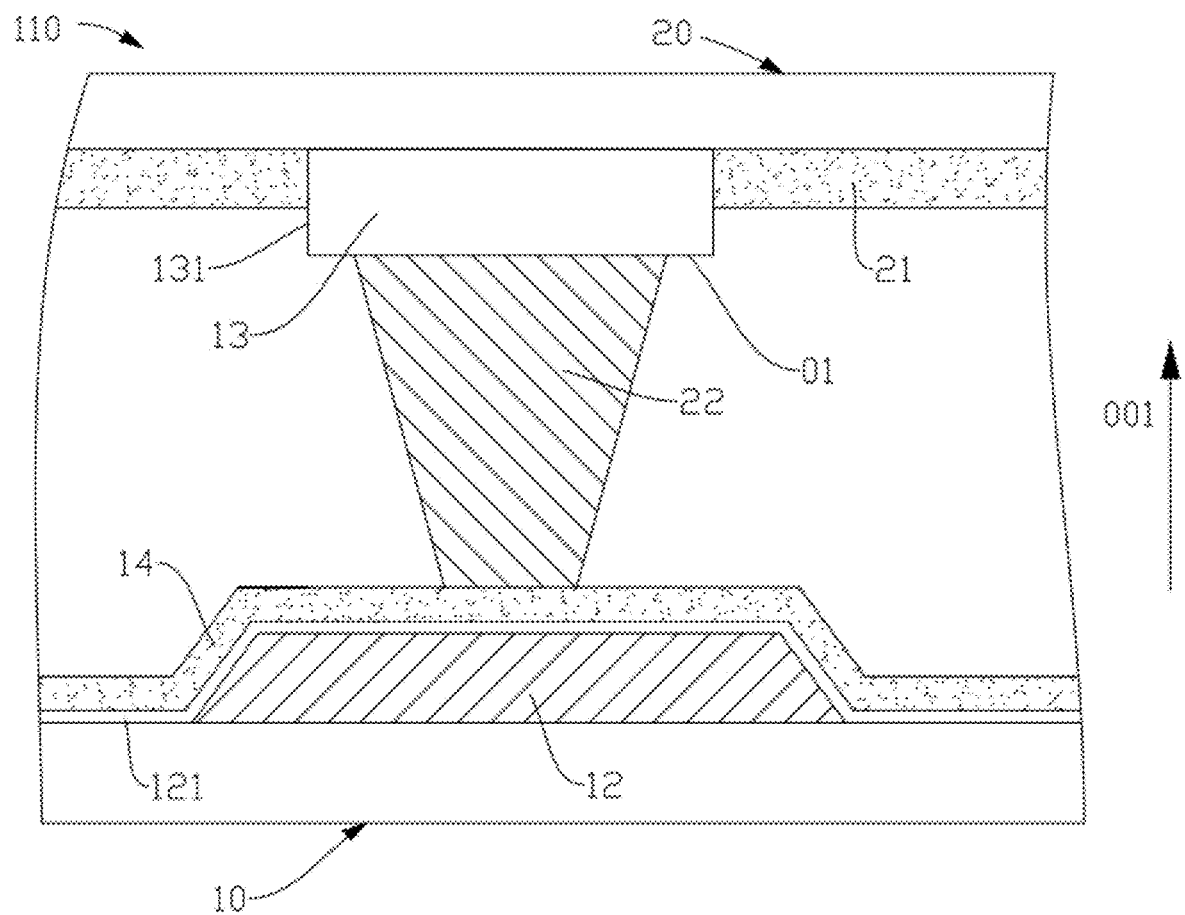
FIG. 5 is a cross-sectional view of another liquid crystal panel of the present application.

Another liquid crystal panel 110 to which the present application relates is shown in FIG. 5. Similar to the liquid crystal panel 100 described above, the liquid crystal panel 110 also includes an array substrate 10 and a color filter substrate 20 disposed opposite to each other. The array substrate 10 is provided with a stacked fan-out line 12 and a common electrode line 14 along the first direction 001. The common electrode line 14 has a shape corresponding to the fan-out line 12 and is insulated from each other. Specifically, an insulated protection layer 121 is disposed between the common electrode line 14 and the fan-out line 12.

The color filter substrate 20 is provided with a columnar spacer 22 and a common electrode layer 21 corresponding to the position of the common electrode line 14 along the first direction 001. Different from the liquid crystal panel 100, the color resist layer 13 in the liquid crystal panel 110 is disposed on the color filter substrate 20, and the color resist layer 13 is further away from the array substrate 10 with respect to the columnar spacer 22. The columnar spacer 22 is disposed on the color resist layer 13, and the position of the color resist layer 13 corresponds to the position of the common electrode line 14, and the columnar spacer 22 and the common electrode line 14 are mutually abutted to ensure the distance between the array substrate 10 and the color filter substrate 20. The color resist layer 13 also includes a first plane 01 facing toward the array substrate 10. It can be understood that the columnar spacer 22 is disposed on the first plane 01.

In the technical solution of the liquid crystal panel 110, the common electrode layer 21 is disposed around the color resist layer 13 and at least exposes the first plane 01. In a similar principle, when the color filter substrate 20 or the array substrate 10 is subjected to a larger external force, the columnar spacer 22 is offset or compressed with respect to the common electrode line 14, so that the array substrate 10 comes into contact with the color resist layer 13. Specifically, the array substrate 10 is in contact with the first plane 01. Since the common electrode layer 21 is not covered on the first plane 01, the array substrate 10 does not electrically connect with the first plane 01 during the contact process, thereby avoiding the short circuit phenomenon between the array substrate 10 and the color filter substrate 20 due to a larger external force impact. The liquid crystal panel 110 thus has higher reliability and service life.

The difference between the liquid crystal panel 110 and the liquid crystal panel 100 is that the color resist layer 13 is disposed on the color filter substrate 20. Correspondingly, the coverage of the color resist layer 13 is changed from the common electrode line 14 to the common electrode layer 21. For the color resist layer 13, it can also be set to a rectangular or trapezoidal structure. It can be understood that, like the color resist layer 13 located on the array substrate 10, when the color resist layer 13 is a cuboid, the surrounding of the common electrode layer 21 to the color resist layer 13 is limited to the periphery of the four sidewalls 131. When the cross section of the color resist layer 13 is trapezoidal, the common electrode layer 21 may be disposed around the four sidewalls 131, or may at least partially cover the four sidewalls 131 to ensure that the common electrode layer 21 covers the largest area of the color resist layer 13.

Figure 6:
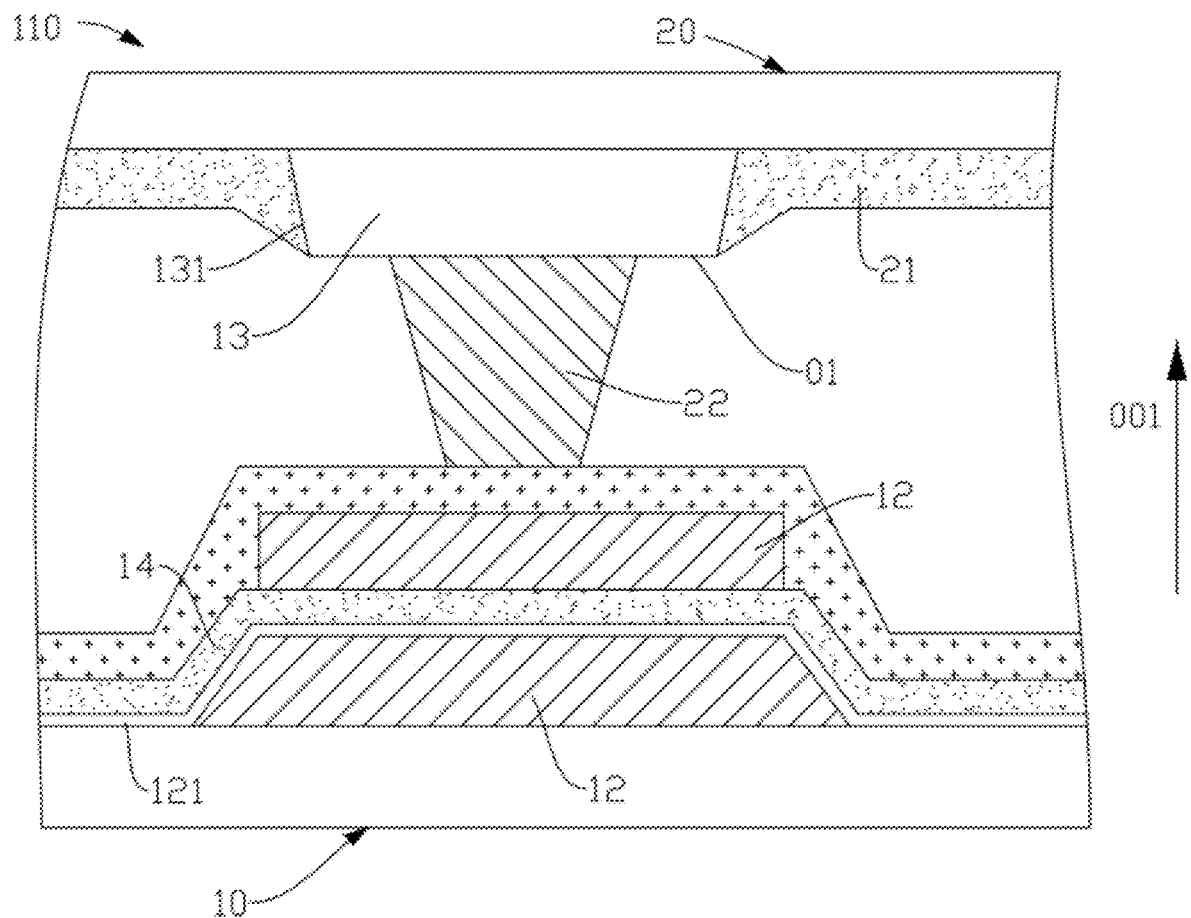
FIG. 6 is a cross-sectional view of another liquid crystal panel of the present application.

An embodiment is shown in FIG. 6, in order to reduce the area ratio of the fan-out line 12, the fan-out line 12 is provided in two layers. The two fan-out lines 12 are insulated and stacked, and the transmission paths of the two fan-out lines 12 are completely the same, and the two fan-out lines 12 are connected in parallel, thereby reducing the transmission resistance of the fan-out line 12.

The present application also relates to a liquid crystal display and an electronic device. Wherein the liquid crystal display includes the liquid crystal panel 100 or the liquid crystal panel 110 of the present application. The electronic device includes the liquid crystal display equipped with the liquid crystal panel 100 or the liquid crystal panel 110. It is to be understood that because the liquid crystal display device is equipped with the liquid crystal panel 100 or the liquid crystal panel 110, the short circuit problem between the array substrate 10 and the color filter substrate 20 due to a larger external force is controlled in the fan-out region 11. Therefore, the liquid crystal display and the electronic device equipped with the liquid crystal display each have higher reliability and service life due to the liquid crystal panel 100 or the liquid crystal panel 110.

It can be understood that the electronic device according to the embodiment of the present application may be any device having communication and storage functions, such as a tablet computer, a mobile phone, an e-reader, a remote controller, a personal computer (PC), a notebook computer, an in-vehicle device, network TV, wearable devices and other smart devices with network capabilities.

The embodiments described above do not constitute a limitation on the scope of protection of the technical solutions. Any modifications, equivalent substitutions and improvements made within the spirit and principles of the above-described embodiments are intended to be included within the scope of the technical solutions.

What is claimed is:

1. A liquid crystal panel, comprising:
   an array substrate and a color filter substrate which are disposed opposite;
   multiple fan-out lines and a color resist layer stacked along a direction from the array substrate toward the color filter substrate;
   wherein a projection of the color resist layer on the fan-out line is accommodated in the fan-out line, and the color resist layer includes a first plane facing toward the color filter substrate;
   wherein a common electrode line corresponding to the fan-out line in shape is stacked on the fan-out line, and the common electrode line is disposed around the color resist layer and at least exposes the first plane;
   wherein the color filter substrate is provided with a common electrode layer along a direction from the color filter substrate toward the array substrate, and a columnar spacer is disposed between the common electrode layer and the first plane; and
   wherein the common electrode line that is disposed around the color resist layer is set in contact with the color resist layer and exposes the first plane of the color resist layer.

2. The liquid crystal panel according to claim 1, wherein the first plane is rectangular, the first plane includes a first side and a second side which are adjacent, a section of the color resist layer perpendicular to the first side or the second side is a trapezoid, the color resist layer includes four sidewalls connected to the first plane, and the common electrode line is disposed around the four sidewalls.

3. The liquid crystal panel according to claim 2, wherein the common electrode line partially covers the four sidewalls and the common electrode line is lower than the first plane.

4. The liquid crystal panel according to claim 1, wherein the fan-out line has two layers, and the two layers of the fan-out line is insulated and stacked.

5. The liquid crystal panel according to claim 2, wherein the fan-out line has two layers, and the two layers of the fan-out line is insulated and stacked.

6. The liquid crystal panel according to claim 3, wherein the fan-out line has two layers, and the two layers of the fan-out line is insulated and stacked.

7. A liquid crystal display device including a liquid crystal panel, wherein the liquid crystal panel comprises:
   an array substrate and a color filter substrate which are disposed opposite;
   multiple fan-out lines and a color resist layer stacked along a direction from the array substrate toward the color filter substrate;
   wherein a projection of the color resist layer on the fan-out line is accommodated in the fan-out line, and the color resist layer includes a first plane facing toward the color filter substrate;
   wherein a common electrode line corresponding to the fan-out line in shape is stacked on the fan-out line, and the common electrode line is disposed around the color resist layer and at least exposes the first plane;
   wherein the color filter substrate is provided with a common electrode layer along a direction from the color filter substrate toward the array substrate, and a columnar spacer is disposed between the common electrode layer and the first plane; and
   wherein the common electrode line that is disposed around the color resist layer is set in contact with the color resist layer and exposes the first plane of the color resist layer.

8. The liquid crystal display device according to claim 7, wherein the first plane is rectangular, the first plane includes a first side and a second side which are adjacent, a section of the color resist layer perpendicular to the first side or the second side is a trapezoid, the color resist layer includes four sidewalls connected to the first plane, and the common electrode line is disposed around the four sidewalls.

9. The liquid crystal display device according to claim 8, wherein the common electrode line partially covers the four sidewalls and the common electrode line is lower than the first plane.

10. The liquid crystal display device according to claim 7, wherein the fan-out line has two layers, and the two layers of the fan-out line is insulated and stacked.

11. The liquid crystal display device according to claim 8, wherein the fan-out line has two layers, and the two layers of the fan-out line is insulated and stacked.

12. The liquid crystal display device according to claim 9, wherein the fan-out line has two layers, and the two layers of the fan-out line is insulated and stacked.

13. A liquid crystal display panel, comprising:
an array substrate and a color filter substrate which are disposed opposite;
multiple fan-out lines, a protection layer and a common electrode layer stacked along a direction from the array substrate toward the color filter substrate;
wherein the color filter substrate is provided with a color resist layer corresponding to a location of the common electrode line along a direction from the color filter substrate to the array substrate, and the color resist layer includes a first plane facing toward the array substrate;
wherein the color filter substrate is also provided with a common electrode layer, and the common electrode layer is disposed around the color resist layer and is lower than the first plane, wherein the first plane is protruded with a columnar spacer, and the columnar spacer and the common electrode line are abutted with each other; and
wherein the common electrode layer that is disposed around the color resist layer is set in contact with the color resist layer and exposes the first plane of the color resist layer.

14. The liquid crystal display panel according to claim 13, wherein the first plane is rectangular, the first plane includes a first side and a second side which are adjacent, a section of the color resist layer perpendicular to the first side or the second side is a trapezoid, the color resist layer includes four sidewalls connected to the first plane, the common electrode line is disposed around the four sidewalls, the common electrode is lower than the first plane.

15. The liquid crystal display panel according to claim 13, wherein the fan-out line has two layers, and the two layers of the fan-out line is insulated and stacked.

16. The liquid crystal display panel according to claim 14, wherein the fan-out line has two layers, and the two layers of the fan-out line is insulated and stacked.

* * * * *